United States Patent [19]

Metzger

[11] Patent Number: 4,627,383
[45] Date of Patent: Dec. 9, 1986

[54] ANIMAL WASTE COLLECTION ARRANGEMENT

[75] Inventor: Romain Metzger, Deerfield, Ill.

[73] Assignee: Container Corporation of America, Chicago, Ill.

[21] Appl. No.: 699,352

[22] Filed: Feb. 7, 1985

[51] Int. Cl.⁴ .............................................. A01K 29/00
[52] U.S. Cl. .............................................. 119/1; 4/661; 4/DIG. 11
[58] Field of Search ............... 119/1; 4/309, 459, 453, 4/661, DIG. 11

[56] References Cited

U.S. PATENT DOCUMENTS

| | | | |
|---|---|---|---|
| 2,144,329 | 1/1939 | Conlon | 119/1 |
| 2,741,223 | 4/1956 | Winborn | 119/1 |
| 3,762,875 | 10/1973 | Burmeister | 119/1 |
| 3,990,397 | 11/1976 | Lowe | 119/1 |
| 4,326,481 | 4/1982 | Gruss | 119/1 |

FOREIGN PATENT DOCUMENTS 362118  2/1973  U.S.S.R. ..................... 4/DIG. 11

*Primary Examiner*—Robert P. Swiatek
*Assistant Examiner*—John G. Weiss
*Attorney, Agent, or Firm*—Richard W. Carpenter

[57] ABSTRACT

An arrangement for conveniently collecting waste material from pet animals in a household which includes the use of a housing with a detachable cover and containing a receptacle for receiving the waste material which receptacle is filled with water, and oil on top of the water, to prevent unpleasant odors from escaping from the receptacle.

6 Claims, 3 Drawing Figures

ANIMAL WASTE COLLECTION ARRANGEMENT

BACKGROUND OF THE INVENTION

1. Field of the Invention

This invention relates to animal waste collection devices, and more particularly to an arrangement for use in the home for collecting wastes from pet animals.

2. Description of the Prior Art

A prior art search directed to the subject matter of this application in the United States Patent and Trademark Office disclosed the following patents: U.S. Pat. Nos.: 2,053,594; 2,144,329; 2,390,854; 2,469,784; 3,757,738 3,822,671; 3,890,931; 3,937,182; 3,990,397; 4,326,481; French Pat. No. 2,530,923.

None of the prior art uncovered in the search discloses a device like that of the present invention which includes a housing having a removable cover and being adapted to hold a a waste material receiving receptacle that is surrounded by material adapted to attract an animal and which contains a light liquid floating on a heavy liquid to prevent odors from escaping from the receptacle.

SUMMARY OF THE INVENTION

It is an object of the present invention to provide an arrangement for collecting waste from pet animals that is relatively free from unpleasant odors.

A more specific object of the invention is the provision, in an arrangement in the type described, of a housing with a removable cover and separate receptacle for collecting the waste material, which receptacle is filled with thin liquids, one lighter than the other, to prevent odors from escaping from material collected in the receptacle.

Another object of the invention is the provision of an animal collection device having a removable cover which can be readily cleaned.

Another object of the invention is the provision, in a device of the type described, of a housing having an internal wall defining a well for receiving the material collecting receptacle, whereby animal attracting material can be spread on the bottom wall of the housing surrounding the wall and will not be disturbed when the receptacle is removed for emptying These and other objects of the invention will be apparent from the examination of the following description and drawings.

Figure 1:
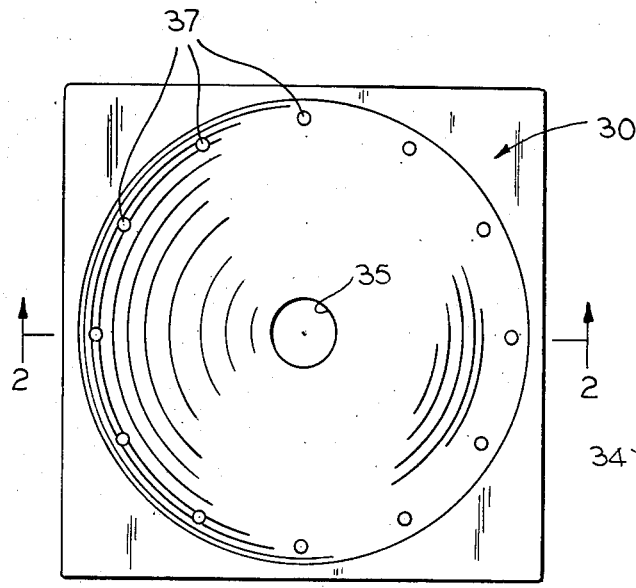
FIG. 1 is a top plan view of an animal waste collection arrangement embodying features of the invention.

It will be understood that, for purposes of clarity, certain elements may have been intentionally omitted from certain views where they are believed to be illustrated to better advantage in other views.

DESCRIPTION OF THE PREFERRED EMBODIMENT

Referring now to the drawings for a better understanding of the invention, it will be seen that the animal waste collection arrangement device which is adapted for use in the home as a convenience to pet owners, includes a housing, indicated generally at 10, which has a bottom wall 12 and a plurality of side walls 14 joined to the bottom wall and to each other and upstanding from the bottom wall to form therewith a hollow, box-like structure.

The housing 10, as well as a cover 30 referred to later in the specification, may be formed of molded plastic material or plastic coated paper, paperboard, or other material which may be readily cleaned by rinsing or washing in soapy water or other chemical.

Figure 3:
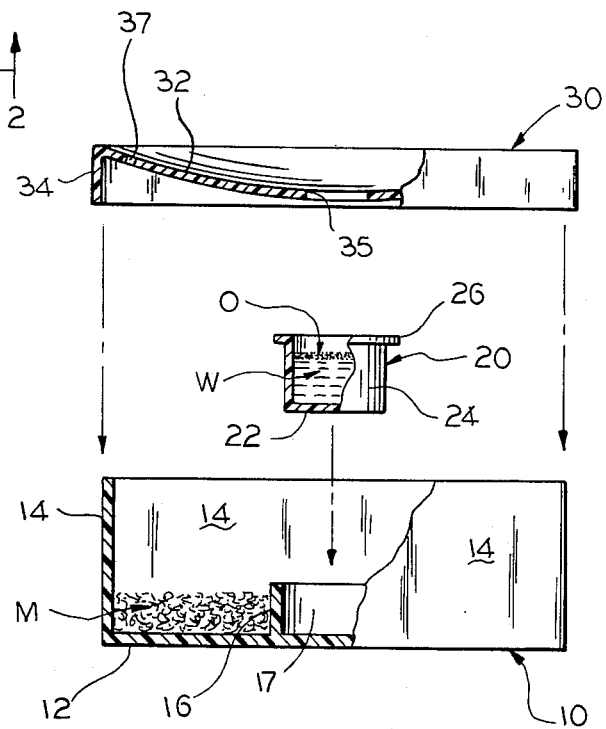
FIG. 3 is an exploded view of the structure illustrated in FIG. 2.
Figure 2:
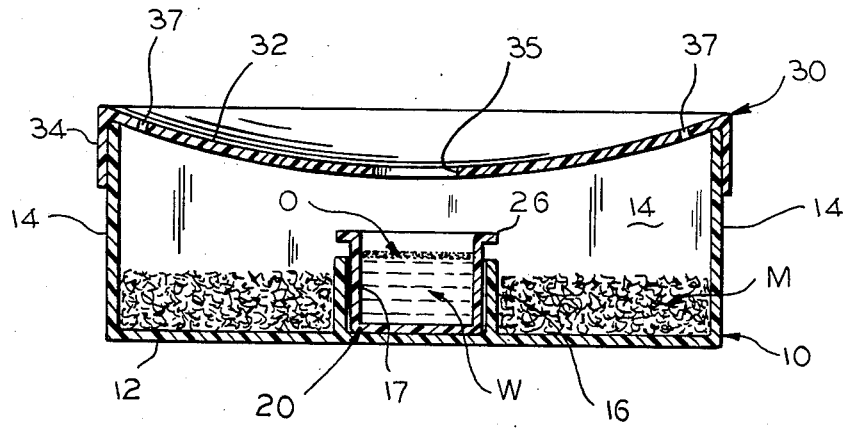
FIG. 2 is a transverse, vertical sectional view taken on line 2—2 of FIG. 1.

As best seen in FIGS. 2 and 3, housing 10 also includes a preferably annular inner wall 16 which is of less height than the side walls 14 and which defines with the bottom wall a recess or wall 17 adapt to receive a receptacle 20.

The purpose of the inner wall 16 is to separate the receptacle receiving well 17 from the remaining portion of the housing, so that animal attracting material, such as kitty litter, can be placed around the receptacle and kept there indefinitely without having to be changed and without interfering with the positioning and removal of the receptacle 20 from the housing.

Still referring to FIGS. 2 and 3, it will be seen that the receptacle 20 includes a bottom wall 22 and a cylindrical side wall 24 joined thereto and upstanding therefrom to provide a another box-like or cup-like structure. The upper portion of the side wall 24 may be provided with an outwardly extending flange 26 to facilitate handling of the receptacle.

Although the shape of the housing shown to the drawings is generally rectangular, and the shape of the receptacle generally round or cylindrical, it will be understood that the novelty in this invention does not depend on the specific configuration of either the housing or the receptacle retained within the housing. If desired, the housing can be round and the receptacle square.

Still referring to FIGS. 2 and 3, it will be seen that there is provided a separate removable cover 30 which is generally dish-shaped or funnel-shaped with its lowest point preferably located at its center. If desired, however, the lowest point could be provided at some other location, so long as the waste receiving receptacle is located in the same area.

Cover 10 includes a top wall 32 and an integral peripheral outer skirt or side flange 34 depending therefrom and adapted to engage the upper portions of the sides of the housing to keep the cover in place.

As previously mentioned, top wall 32 of the cover is lower in the center and is provided with a central opening 35 which is located directly over the housing well 17, in which the the waste receiving receptacle 20 is positioned.

Top wall 32 may be provided with a plurality of smaller openings or holes 37 which permit the animal attracting odor from the material M in the housing to escape so as to encourage an animal to use the collection device. The material M may be conventional kitty litter or any other type of material which is attractive to the type of animal for whose use the device is intended.

Again referring to FIGS. 2 and 3, it will be seen that the waste receiving receptacle 20 is shown partially filled with waste liquid such as urine, indicated generally at W, which has on top of it a lighter liquid such as oil, indicated generally at O.

The purpose of placing the oil in the receptacle is to prevent the emanation of unpleasant odors from the receptacle when it is filled with waste material. After waste material passes through the central opening 35 in the cover and down to the bottom of the receptacle 20, the oil floats to the top to cover the waste and prevent any unpleasant odor from escaping therefrom.

It will be understood that another liquid may be substituted for the oil, but the essential feature of the invention is to have in the receptacle a liquid that is lighter than a waste liquid, such as urine, so that it will float on top of the waste material and provide a protective coating.

Thus, it will be appreciated that the novel arrangement is of relatively simple design and construction so as to be economical to produce and sell. At the same time the device lends itself to be cleaned very easily and does not require constant replenishing with expensive material such as kitty litter.

What is claimed is:

1. In a sanitary arrangement for collecting pet animal wastes, the combination of:
   (a) a housing having a bottom wall and at least one side wall extending upwardly therefrom to form therewith a box-like structure open at the top;
   (b) a readily removable cover seated on said housing;
   (c) said cover having an opening extending therethrough at the lowest area thereof for the passage of animal wastes and being inclined gradually downwardly from its outer periphery toward said opening;
   (d) a removable waste receiving receptacle positioned on the bottom wall of said housing under said opening;
   (e) a wall-like element extending upwardly from said said housing bottom wall to surround said receptacle.

2. In a sanitary arrangement for collecting pet animal wastes, the combination of:
   (a) a housing having a bottom wall and at least one side wall extending upwardly therefrom to form therewith a box-like structure open at the top;
   (b) a readily removable cover seated on said housing;
   (c) said cover having an opening extending therethrough at the lowest area thereof for the passage of animal wastes and being inclined gradually downwardly from the outer periphery toward said opening;
   (d) a removable waste receiving receptacle positioned on the bottom wall of said housing under said opening;
   (e) said receptacle containing a liquid, such as oil, which is lighter than animal liquid waste, so that when animal wastes pass through the cover opening into said receptacle, the lighter liquid will float on top of the heavier liquid and prevent odors from escaping from said receptacle;
   (f) animal attracting material, such as kitty litter material, disposed on the bottom wall of said housing around said receptacle;
   (g) a wall-like element separating said receptacle from said animal attracting material, so that when the receptacle is removed temporarily to be emptied, the material won't spill into the area of the receptacle.

3. In a sanitary arrangement for collecting pet animal wastes, the combination of:
   (a) a housing having a bottom wall and at least one side wall extending upwardly therefrom to form therewith a box-like structure open at the top;
   (b) a readily removable cover seated on said housing;
   (c) said cover having an opening extending therethrough at the lowest area thereof for the passage of animal wastes and being inclined gradually downwardly from the outer periphery toward said opening;
   (d) a removable waste receiving receptacle positioned on the bottom wall of said housing under said opening;
   (e) animal attracting material, such as Kitty litter material, disposed on the bottom wall of said housing around said receptacle;
   (f) a wall-like element separating said receptacle from said animal attracting material, so that when the receptacle is removed temporarily to be emptied, the material won't spill into the area of the receptacle.

4. An arrangement according to claim 3, wherein said cover includes a plurality of relatively small holes to permit the odor of animal attracting material to escape from the housing.

5. An arrangement according to claim 3, wherein said housing and cover are formed of plastic or plastic coated material so as to be readily cleanable.

6. An arrangement according to claim 3, wherein said cover is in the general shape of an inverted cone.

* * * * *